(12) United States Patent
Kaltenbach et al.

(10) Patent No.: US 10,286,773 B2
(45) Date of Patent: May 14, 2019

(54) DEVICE INCLUDING A GEAR UNIT AND AN ELECTRIC MACHINE FOR A HYBRID DRIVE AND HYBRID DRIVE

(71) Applicant: ZF Friedrichshafen AG, Friedrichshafen (DE)

(72) Inventors: Johannes Kaltenbach, Friedrichshafen (DE); Uwe Griesmeier, Markdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 1196 days.

(21) Appl. No.: 14/256,380

(22) Filed: Apr. 18, 2014

(65) Prior Publication Data

US 2014/0311285 A1    Oct. 23, 2014

(30) Foreign Application Priority Data

Apr. 19, 2013 (DE) .......................... 10 2013 207 132

(51) Int. Cl.
*B60K 6/48* (2007.10)
*B60K 6/547* (2007.10)
*F16H 3/097* (2006.01)
*F16H 3/093* (2006.01)

(52) U.S. Cl.
CPC ............... *B60K 6/547* (2013.01); *B60K 6/48* (2013.01); *F16H 3/097* (2013.01);
(Continued)

(58) Field of Classification Search
CPC .. B60K 6/48; B60K 6/547; B60K 2006/4825; F16H 3/097; F16H 2003/0933; F16H 2200/0056
(Continued)

(56) References Cited

U.S. PATENT DOCUMENTS 5,819,601 A * 10/1998 Kuhn .................... F16H 3/0915
  74/745
6,428,438 B1 * 8/2002 Bowen ..................... B60K 6/36
  475/5
(Continued)

FOREIGN PATENT DOCUMENTS

DE        198 50 549 A1    5/2000
DE    10 2005 035 328 A1    3/2007
(Continued)

OTHER PUBLICATIONS

Search Report dated Jan. 7, 2014 for DE 10 2013 207 132.9.

*Primary Examiner* — William C Joyce
(74) *Attorney, Agent, or Firm* — Brinks Gilson & Lione

(57) ABSTRACT

A device includes a transmission and an electric machine for a hybrid drive of a motor vehicle, and the transmission includes first and second subtransmissions. The substransmissions each have an input shaft and they share an output shaft. The input shafts of the subtransmissions can be selectively coupled to the output shaft via form locking clutches of the subtransmissions. In particular, a first input shaft of the first subtransmission is allocated to a first friction locking clutch while a second input shaft of a second subtransmission is allocated to a second friction locking clutch. Furthermore, a third clutch is incorporated between an input drive side clutch half of the first friction locking clutch and an input drive side clutch half of the second friction locking clutch.

12 Claims, 6 Drawing Sheets

(52) U.S. Cl.
CPC . *B60K 2006/4825* (2013.01); *B60Y 2400/421* (2013.01); *F16H 2003/0933* (2013.01); *F16H 2200/0056* (2013.01); *Y02T 10/6221* (2013.01); *Y02T 10/6252* (2013.01); *Y10S 903/902* (2013.01); *Y10T 74/19014* (2015.01)

(58) Field of Classification Search
USPC .......................................................... 74/330
See application file for complete search history.

(56) References Cited

U.S. PATENT DOCUMENTS

| | | | | |
|---|---|---|---|---|
| 6,499,370 | B2* | 12/2002 | Bowen | F16H 3/006 74/330 |
| 6,634,247 | B2* | 10/2003 | Pels | B60K 6/26 477/6 |
| 7,552,658 | B2* | 6/2009 | Forsyth | F16H 3/006 74/329 |
| 2005/0043141 | A1* | 2/2005 | Neuner | F16D 21/06 477/166 |
| 2005/0101426 | A1* | 5/2005 | Sugino | F16H 37/042 475/207 |
| 2006/0021456 | A1 | 2/2006 | Hughes | |
| 2006/0130601 | A1* | 6/2006 | Hughes | B60K 6/36 74/340 |

FOREIGN PATENT DOCUMENTS

| | | | |
|---|---|---|---|
| DE | 10 2007 051 991 A1 | * | 5/2009 |
| DE | 10 2010 030 567 A1 | | 12/2011 |
| EP | 2 457 760 | * | 5/2012 |

* cited by examiner

DEVICE INCLUDING A GEAR UNIT AND AN ELECTRIC MACHINE FOR A HYBRID DRIVE AND HYBRID DRIVE

PRIORITY STATEMENT

This application claims the benefit of Germany Patent Application DE 10 2013 207 132.9, filed Apr. 19, 2013, and incorporates the German Patent Application by reference herein in its entirety.

FIELD

The present disclosure relates to a transmission and an electric machine for a hybrid drive of a motor vehicle.

BACKGROUND

The statements in this section merely provide background information related to the present disclosure and may not constitute prior art.

A motor vehicle with a hybrid drive is known from DE 198 50 549 A1, wherein the hybrid drive comprises an internal combustion engine, an electric machine, and a transmission designed as a double clutch transmission. The double clutch transmission of the hybrid drive in DE 198 50 549 A1 has two subtransmissions, each of which has a separate input shaft and a shared output shaft. The subtransmissions of the double clutch transmission according to DE 198 50 549 A1 have form locking shift elements, by means of which the two input shafts can be selectively coupled to the shared output shaft. An electric machine is coupled to at least one input shaft of at least one subtransmission. According to this prior art, a friction locking clutch is allocated to each input shaft, in order to couple the internal combustion engine to the respective input shaft of the respective subtransmission.

Another motor vehicle with a hybrid drive is known from DE 10 2005 035 328 A1, wherein the hybrid drive comprises an internal combustion engine, an electric machine and a transmission designed as a double clutch transmission. According to this prior art, a friction locking clutch is allocated to each of the two input shafts of the double clutch transmission, specifically such that an output side half of a first friction locking clutch is connected directly to a first input shaft of a first subtransmission and an output side half of a second friction locking clutch is connected directly to a second input shaft of a second subtransmission.

There is, however, a desire to improve a device comprising a transmission and an electric machine for a hybrid drive, as well as a hybrid drive having a configuration of this type, such that with only one single electric machine, the number and type of functions that can be provided can be increased, such that a more comfortable and dynamic driving operation and a good degree of efficiency can be implemented. Even when an electric energy storage unit functioning in conjunction with the electric machine has been discharged, a good functionality should be ensured.

Based on this, the present disclosure addresses the objective of creating a new type of device comprising a transmission and an electric machine for a hybrid drive of a motor vehicle, and a new type of hybrid drive for a motor vehicle.

SUMMARY

The present disclosure provides a device comprising a transmission and an electric machine for a hybrid drive of a motor vehicle, wherein the transmission is designed as a multi-stage standard transmission having two subtransmissions, each of which has a separate input shaft and shared output shaft. Both of the input shafts can be selectively coupled to the shared output shaft via form locking shift elements of the subtransmissions, wherein a first input shaft of a first subtransmission is allocated to a first friction locking clutch, such that this clutch can be engaged between the first subtransmission and an internal combustion engine, and wherein a second input shaft of a second subtransmission is allocated to a second friction locking clutch, such that this clutch is engaged between the second subtransmission and the electric machine. The device is characterized in that a third clutch is incorporated between the input drive side clutch half of the first friction locking clutch and the input drive side clutch half of the second friction locking clutch.

Because of the presence of the third clutch, there is no longer a shared, permanently connected, drive shaft for the first friction locking clutch and the second friction locking clutch. The drive side clutch halves of the first friction locking clutch and the second friction locking clutch are only connected when the third clutch is engaged. For this, the first friction locking clutch and the second friction locking clutch are not designed as double clutches, but rather, these are implemented by means of two separate clutches.

The third clutch is designed as a friction locking clutch or as a form locking clutch. The advantage of the third clutch as a form locking clutch is less installation space than friction locking clutches, and, moreover, drag losses can be reduced.

According to a first form of the present disclosure, the input drive side clutch half of the first friction locking clutch can be connected directly to the internal combustion engine, wherein the input drive side clutch half of the second friction locking clutch is connected directly to the electric machine.

According to a second form of the present disclosure, the input drive side clutch half of the first friction locking clutch can be connected indirectly, through the interconnection of a fourth clutch, to the internal combustion engine, wherein the input drive side clutch half of the second friction locking clutch is connected directly to the electric machine.

Then, when the device according to the present disclosure comprises a fourth clutch, in addition to the first friction locking clutch, the second friction locking clutch, and the third locking clutch, the number of functions that can be provided is further increased.

In another form of the present disclosure, either the third clutch or the fourth clutch is designed as a form locking clutch, and the other of these two clutches is designed as a friction locking clutch. By this means, the number of functions that can be provided is maximized, while the assembly space requirements and the drag losses are minimized.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

Figure 1:
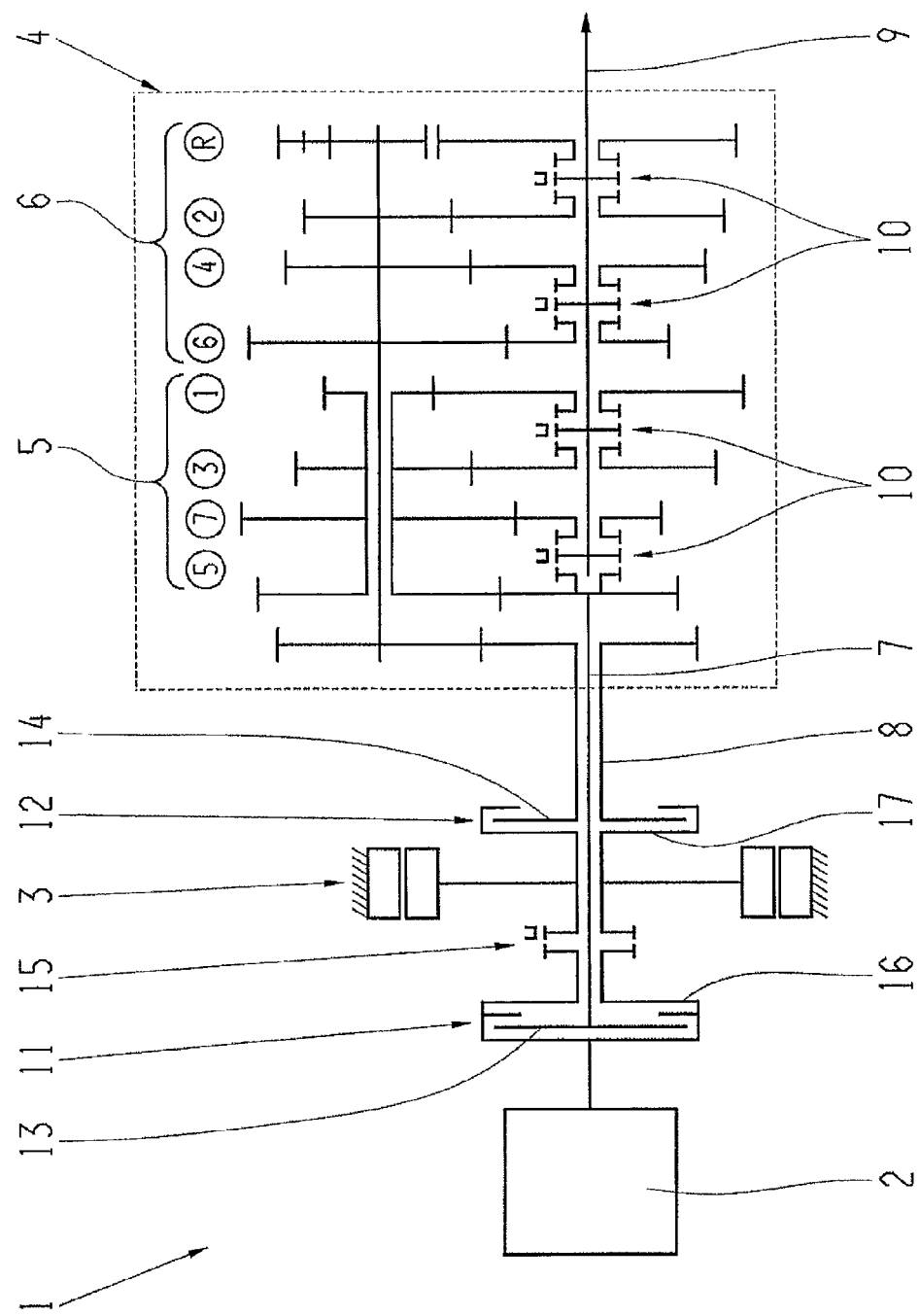
FIG. 1 is a layout for first hybrid drive according to the present disclosure, for a motor vehicle, or a first form of a device according to the present disclosure, comprising a transmission and an electric machine for a hybrid drive, together with an internal combustion engine.

The drawings described herein are for illustration purposes only and are not intended to limit the scope of the present disclosure in any way.

DETAILED DESCRIPTION OF EXAMPLE EMBODIMENTS

The following description is merely exemplary in nature and is not intended to limit the present disclosure, application, or uses. It should be understood that throughout the drawings, corresponding reference numerals indicate like or corresponding parts and features.

FIGS. 1-6 show designs for a hybrid drive 1 according to the present disclosure, for a motor vehicle, or a device according to the present disclosure for a hybrid drive 1, respectively. The device comprises at least one transmission 4 and one electric machine 3, and the respective hybrid drive 1, in addition to the respective form of the device comprising the transmission 4 and the electric machine 3, also has an internal combustion engine 2.

The transmission 4 is designed as a multi-stage standard transmission having two subtransmissions 5 and 6, and the two subtransmissions 5 and 6 each have a separate input shaft 7 or 8, respectively, and a shared output shaft 9.

The first subtransmission 5 provides the forward gears "1," "3," "5," and "7" in FIG. 1. The second subtransmission 6 provides the forward gears "2," "4," and "6," as well as the reverse gear "R".

In FIG. 1, the transmission 4, having the two subtransmissions 5 and 6, has numerous form locking shift elements, combined to form shift packets 10, by means of which each of the two input shafts 7 and 8 of the two subtransmissions 5 and 6 can be selectively coupled to the output shaft 9 of the transmission 4, where the output shaft 9 of the transmission 4 acts on an output drive.

In the shown embodiment, the two input shafts 7 and 8 of the two subtransmissions 5 and 6 are disposed coaxially to one another. The second input shaft 8 is designed as a hollow shaft such that in sections, the second input shaft 8 concentrically encompasses the first input shaft 7. In another form, it is also possible that the electric machine is not connected coaxially, but rather, axially offset, with a spur gear for example. Furthermore, it should be noted that the shown distribution of the gears on the subtransmissions 5 and 6, as well as the gear sets in the transmission, are of a purely exemplary nature. In still another form of the present disclosure, the transmission can also have planetary gear sets or planetary gear sets in combination with spur gear sets.

Moreover, the internal combustion engine 2 and the electric machine 3 can also be positioned on opposite sides of the transmission 4 which is positioned between the electric machine 3 and the internal combustion engine 2. For this, one of the transmission input shafts is located on the other side of the transmission 4.

A first friction locking clutch 11 is allocated to the first input shaft 7 of the first subtransmission 5, and the first friction locking clutch 11 is incorporated between the first subtransmission 5 and the internal combustion engine 2, specifically such that, via the first friction locking clutch 11, the internal combustion engine 2 can be coupled to the first input shaft 7 of the first subtransmission 5, or can be decoupled therefrom, respectively.

A second friction locking clutch 12 is allocated to the second subtransmission 6, specifically the second input shaft 8 thereof, which is incorporated between the second subtransmission 6 and the electric machine 3, specifically such that the electric machine 3 can be coupled to the second input shaft 8 of the second subtransmission 8 via the second friction locking clutch 12, as well as decoupled therefrom.

According to FIG. 1, an output drive side clutch half 13 of the first friction locking clutch 11 is permanently connected to the first input shaft 7 of the first subtransmission 5.

Furthermore, an output drive side clutch half 14 of the second friction locking clutch 12 is permanently connected to the second input shaft 8 of the second subtransmission 6.

Within the concept of the present disclosure, a third clutch 15 is provided, which is incorporated between an input drive side clutch half 16 of the first friction locking clutch 13 and an input drive side clutch half 17 of the second friction locking clutch 12.

This third clutch 15, which is incorporated between the input drive side clutch halves 16 and 17 of the two friction locking clutches 12 and 13, is designed as a form locking clutch in FIG. 1.

Figure 2:
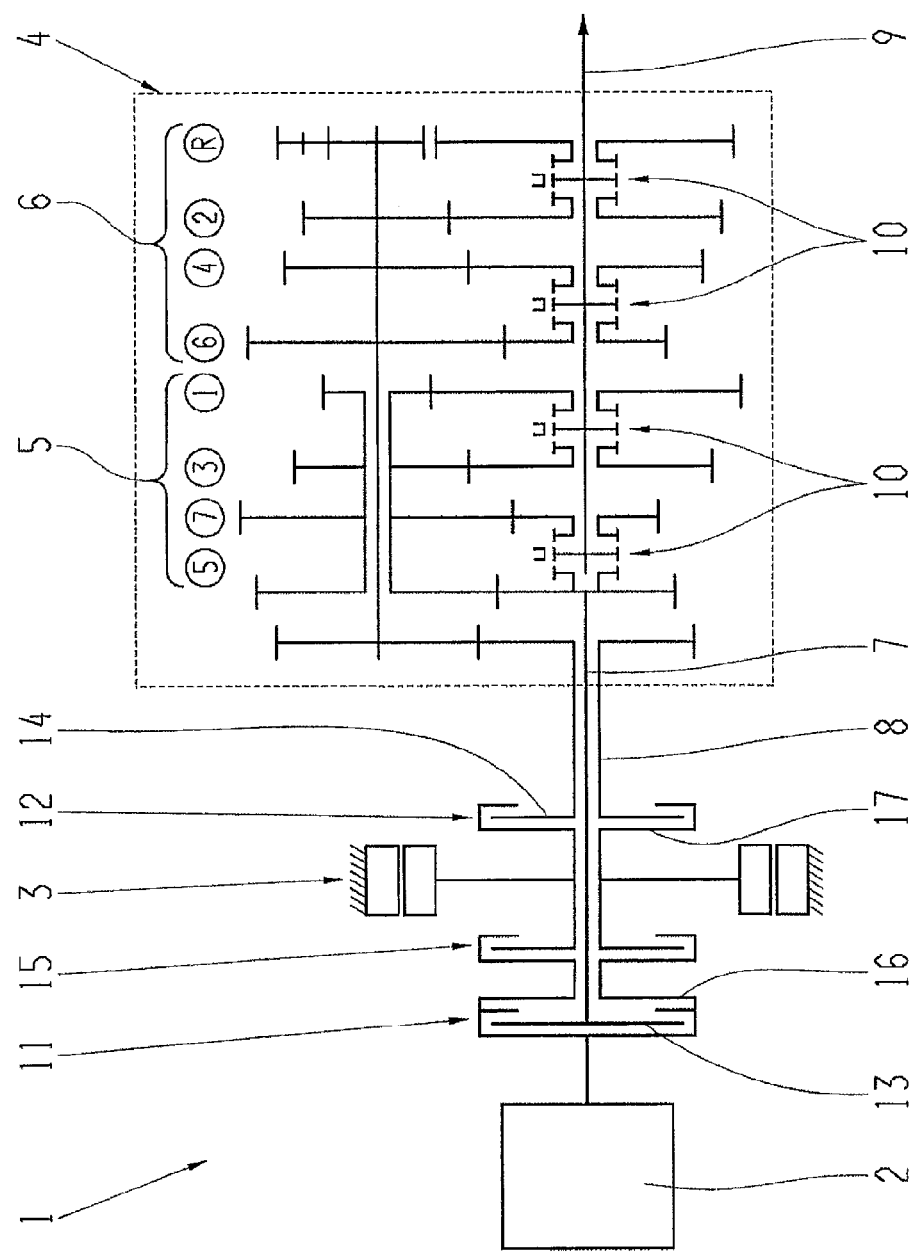
FIG. 2 is a layout for a second hybrid drive according to the present disclosure, for a motor vehicle, or a second form of a device according to the present disclosure, comprising a transmission and an electric machine for a hybrid drive, together with an internal combustion engine.

In contrast to this, in FIG. 2 the third clutch 15 is designed as a friction locking clutch, while, with respect to all of the other details, FIG. 2 corresponds to the embodiment example in FIG. 1.

In FIGS. 1 and 2, the electric machine 3 is, in each case, permanently and directly connected to the input drive side clutch half 17 of the second friction locking clutch 12. Likewise, in the embodiment examples in FIGS. 1 and 2, the internal combustion engine 2 is directly and permanently connected to the input drive side clutch half 16 of the first friction locking clutch 11.

As illustrated in FIGS. 1 and 2, when the first friction locking clutch 11 and the second friction locking clutch 12 are engaged and the third clutch 15 is disengaged, the electric machine 3 is connected to the second subtransmission 6 while the internal combustion engine 2 is connected to the first subtransmission 5. When the first friction locking clutch 11 is disengaged, and the second friction locking clutch 12 and the third clutch 15 are engaged, both the internal combustion engine 2 and the electric machine 3 are connected to the second subtransmission 6. When the second friction locking clutch 12 is disengaged and the first friction locking clutch 11 and the third clutch 15 are engaged, the internal combustion engine 2 and the electric machine 3 are both connected to the first subtransmission 5.

Figure 3:
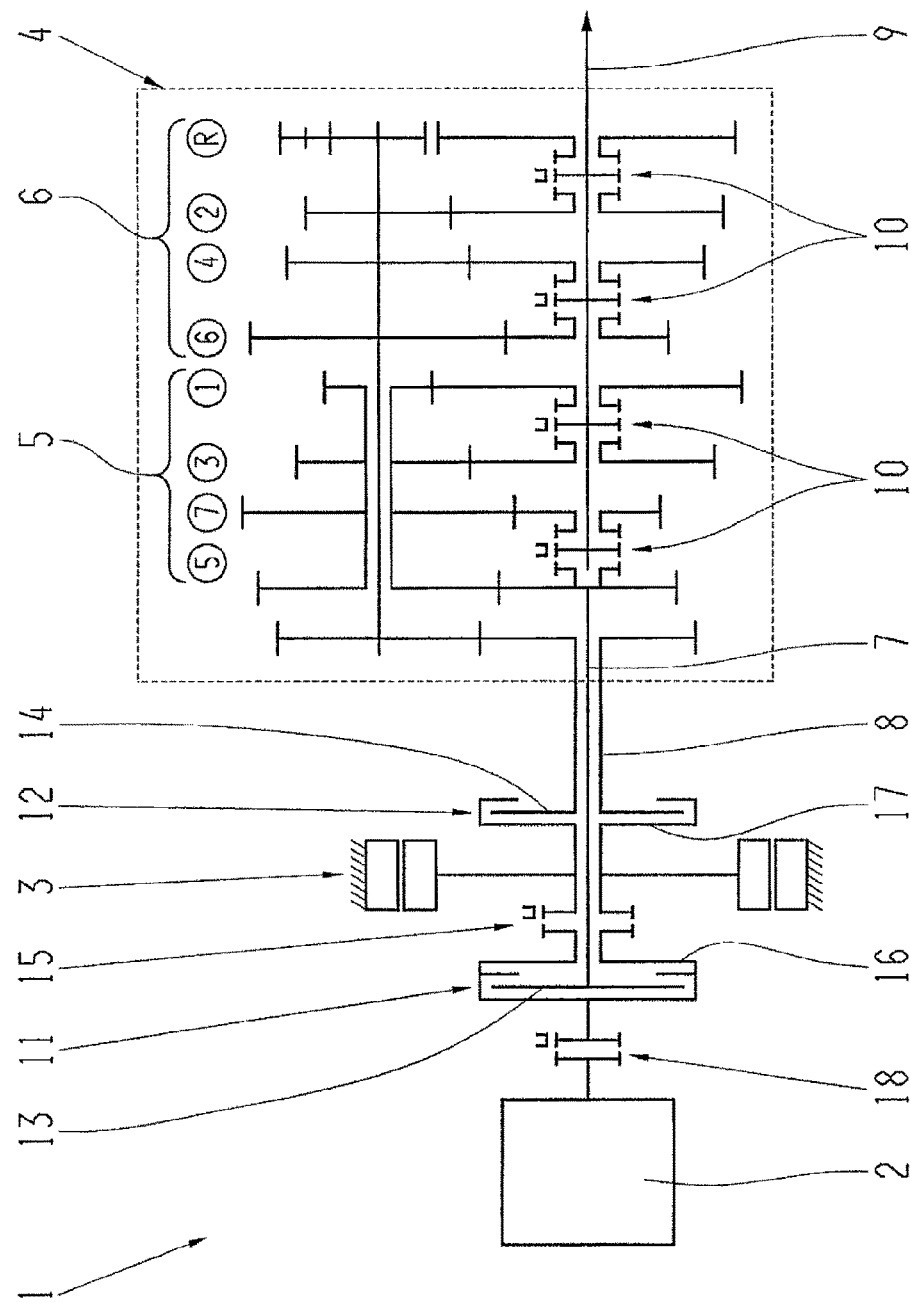
FIG. 3 is a layout for a third hybrid drive according to the present disclosure, for a motor vehicle, or a third form of a device according to the present disclosure, respectively, comprising a transmission and an electric machine for a hybrid drive, together with an internal combustion engine.
Figure 4:
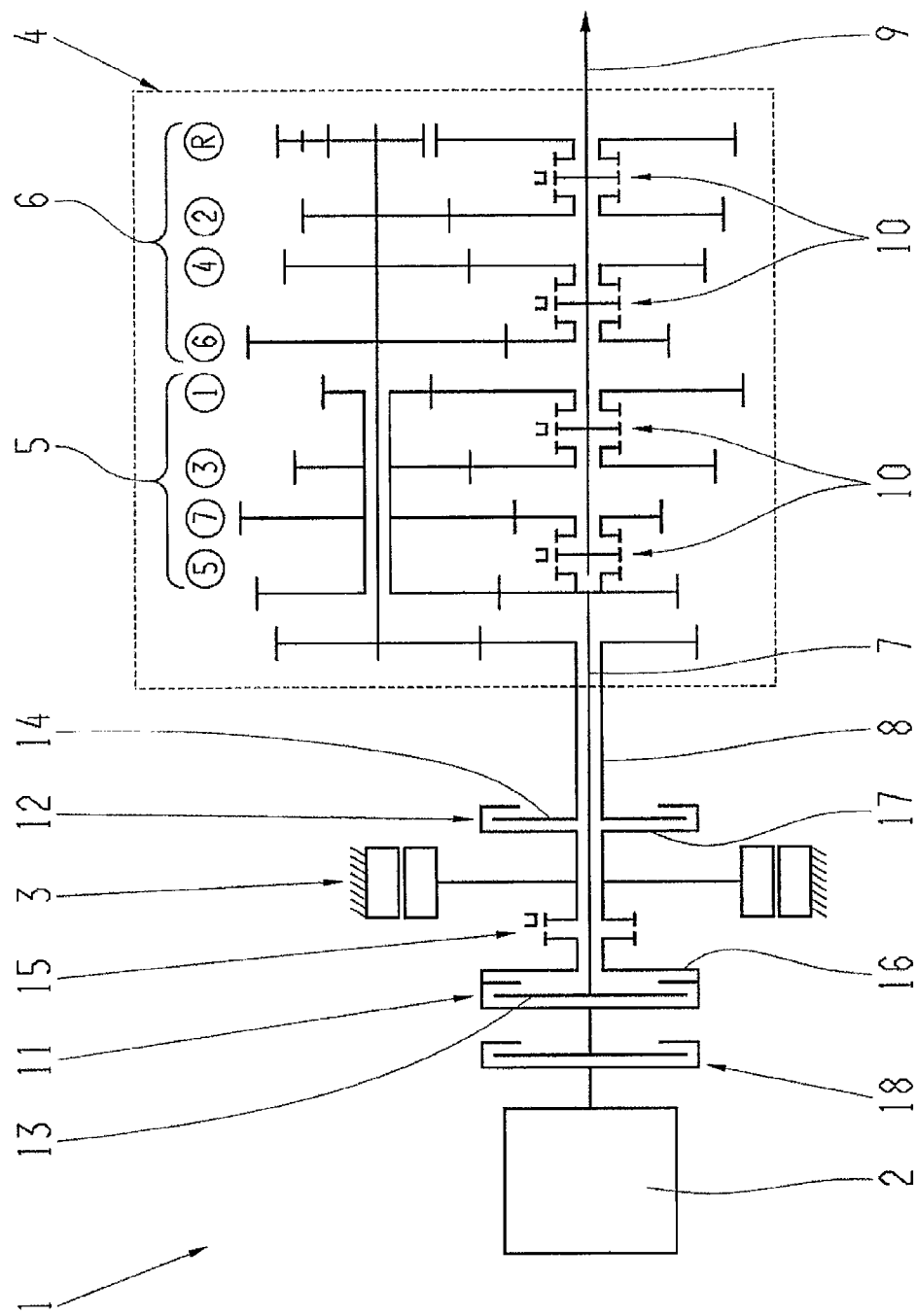
FIG. 4 is a layout for a fourth hybrid drive according to the present disclosure, for a motor vehicle, or a fourth form of a device according to the present disclosure, respectively, comprising a transmission and an electric machine for a hybrid drive, together with an internal combustion engine.
Figure 5:
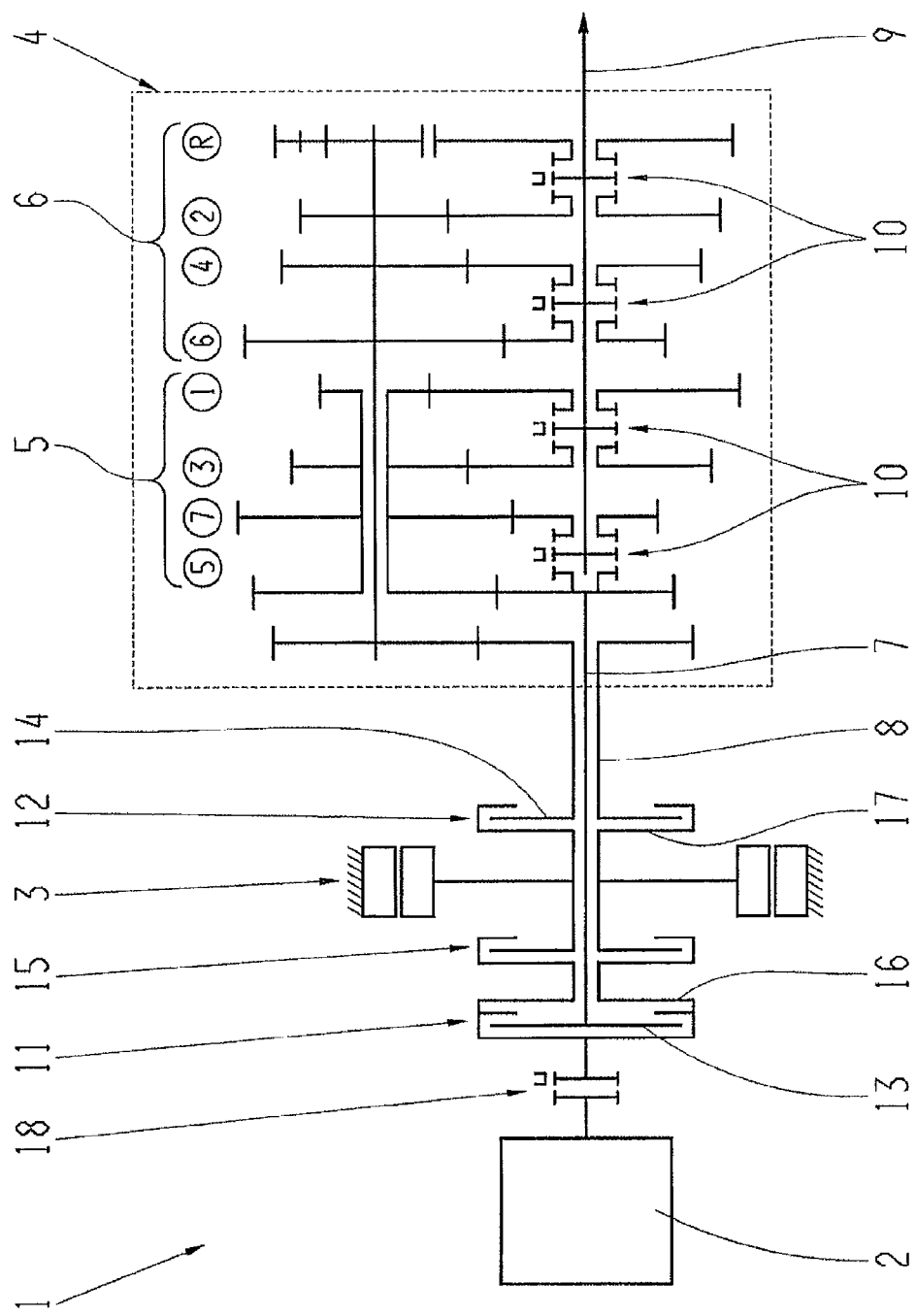
FIG. 5 is a layout for a fifth hybrid drive according to the present disclosure, for a motor vehicle, or a fifth form of a device according to the present disclosure, respectively, comprising a transmission and an electric machine for a hybrid drive, together with an internal combustion engine.

FIGS. 3-6 show advantageous further developments of the present disclosure in which the electric machine 3 is directly and permanently connected to the input drive side clutch half 17 of the second friction locking clutch 12, while the internal combustion engine 2 is indirectly, via a fourth clutch 18, connected to the input drive side clutch half 16 of the first friction locking clutch 11. In FIGS. 3 and 5, the fourth clutch 18 is designed as a form locking clutch in each case, and in FIGS. 4 and 6, the fourth clutch 18 is designed as a friction locking clutch in each case.

In FIGS. 4 and 5, one of the two clutches 15 and 18 is a friction locking clutch and the other of the two clutches 15 and 18 is a form locking clutch. As such, in FIG. 4 the third clutch 15 is a form locking clutch, and the fourth clutch 18 is a friction locking clutch. In contrast, in FIG. 5 the third clutch 15 is a friction locking clutch and the fourth clutch 18 is a form locking clutch.

With this arrangement, while minimizing the necessary assembly space and minimizing the drag losses, it enables a maximum number of operating modes for the hybrid vehicle, as is shown in the following table.

All of the variations according to the present disclosure have in common that they have two friction locking clutches, specifically the first friction locking clutch 11, which is incorporated between the first subtransmission 5 and the internal combustion engine 2, and the third friction locking clutch 12, which is incorporated between the second subtransmission 6 and the electric machine 3, wherein the output drive side clutch halves 13 and 14 of these two friction locking clutches 11, 12 are each permanently connected to the two input shafts 7 or 8, respectively of the two subtransmissions 5 or 6, respectively, and wherein the input drive side clutch halves 16, 17 of these two friction locking clutches 11, 12 can be coupled or decoupled from one another via the third clutch 15. For this, as already explained, the third clutch 15 can be either form locking or friction locking. When the fourth clutch 18 is present, if the third clutch 15 is friction locking, then the fourth clutch 18 is form locking, and if the third clutch 15 is form locking, then the fourth clutch 18 is friction locking.

Figure 6:
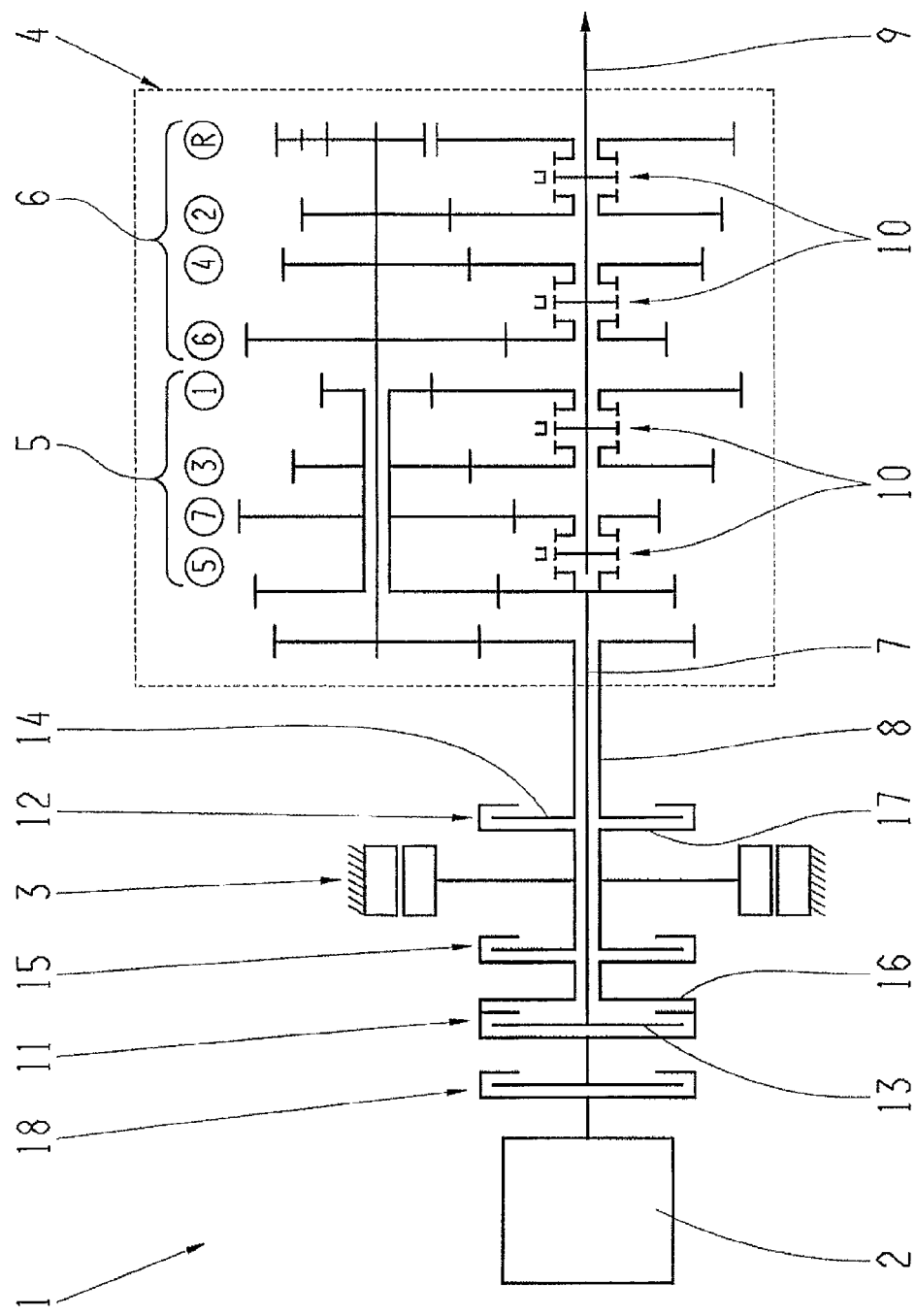
FIG. 6 is a layout for another hybrid drive according to the present disclosure, for a motor vehicle, or another form of a device according to the present disclosure, respectively, comprising a transmission and an electric machine for a hybrid drive, together with an internal combustion engine.

|  | FIG. 1 | FIG. 2 | FIG. 3 | FIG. 4 | FIG. 5 | FIG. 6 |
|---|---|---|---|---|---|---|
| EM as power shifting element | X | X | X | X | X | X |
| Electric mode without drag loss | X | — | X | X | X | — |
| Start-up from charging mode | X | X | X | X | X | X |
| Tow start | X | X | X | X | X | X |
| Tow start with transmission ratio for internal combustion engine | X | X | X | X | X | X |
| Drive start | — | X | — | X | X | X |
| Electric power shifting | X | X | X | X | X | X |
| Stalling safeguard when parking brake is engaged | X | X | X | X | X | X |
| Internal combustion engine start-up | X | X | X | X | X | X |
| Internal combustion engine emergency mode without rotating electric machine | X | X | X | X | X | X |
| Electric operation via slipping clutch | X | X | X | X | X | X |
| Internal combustion engine power shifting | X | X | X | X | X | X |
| Gear stage selection independently of internal combustion engine and electric machine | X | X | X | X | X | X |

In the following, functionalities compiled in the above table, which are entirely or partially provided in the respective embodiments of the present disclosure, are explained briefly.

With the function "EM as power shifting element," a power shifting with alternating support of the output drive torque can be executed in the hybrid drive, i.e. when operated with the internal combustion engine 2 and the electric machine (EM) 2. If a shifting occurs in the first subtransmission 5, the electric machine 3 can support the output torque via the second subtransmission 6. Then, when a shifting is executed in the second subtransmission 6, the internal combustion engine 2 can support the output torque via the first subtransmission 5. During the execution of these shiftings, no energy losses due to friction occur at the friction shift elements.

With the function "Electric mode without drag loss," no drag losses occurs at a friction clutch during pure electric driving via the electric machine (EM) 3 while the internal combustion engine 2 is shut off. This is possible if, for disconnecting the internal combustion engine 2, a form locking clutch is present. The shift elements within the two subtransmissions 5 and 6 are form locking in the embodiment examples shown. The function "Electric mode without drag loss" is provided for so-called plug-in-hybrids having a high portion of electric driving.

In the function "Start-up from charging mode," the electric machine 3 functions as a generator when the energy storage unit is empty, in order to provide electrical energy for an electrical load in the hybrid vehicle, e.g. for an electrically powered air conditioner. In this case, the internal combustion engine 2 and the electric machine 3 are coupled. When the hybrid vehicle is at a standstill, or nearly at a standstill, a start-up, without delay, is requested. For this, a friction locking clutch is necessary between the combination of the internal combustion engine 2 and the electric machine 3, and one of the subtransmissions 5, 6 of the transmission, by means of which a start-up torque can be generated without delay.

With the function "tow start," the internal combustion engine 2 is tow-started via a friction locking clutch during electric driving mode. This tow-start torque can be compensated for via the electric machine 3, such that the tow start has no noticeable effect on the output drive.

With the function "Tow start with transmission ratio for internal combustion engine," the internal combustion engine (VB) 2 has a higher transmission ratio for the output drive than the electric machine 3. This can be achieved in that the electric machine 3 and the internal combustion engine 2 are not connected to the same subtransmission during the tow-starting of the internal combustion engine 2.

With the subtransmission used by the internal combustion engine, a higher gear, or a smaller transmission ratio is engaged in the subtransmission used by the electric machine 3. This has the advantage that a lower rotational speed difference is present at the clutch with which the internal combustion engine 2 is started. As a result, the power loss at this clutch can be reduced. The electric machine 3 then has less torque to compensate for, because the electric machine 3 has a higher transmission ratio at the output drive.

The function "drive start" functions in fundamentally the same manner as the function "tow start," except an additional torque decoupling from the output drive 9. The torque decoupling from the output drive is obtained with a friction locking clutch operated with slippage. The rotational speed difference at this friction clutch is regulated by the electric machine 3. For the function "drive start," a friction clutch between the electric machine 3 and the internal combustion engine 2, as well as a friction clutch between the electric machine 3 and the first subtransmission 5, are provided.

In the function "electric power shifting," power shiftings are possible during purely electric driving, and, accordingly, when the internal combustion engine 2 is shut off. As a result, gear stages of the transmission 4 can also be engaged during purely electrical driving, without interruptions to the tractive force.

The function "stalling safeguard when parking brake is engaged" can only be implemented when a friction locking clutch is provided in the power flow from the internal combustion engine 2 to the output drive, because a friction locking clutch can also be disengaged when under load. A form locking clutch cannot be disengaged in this case, without further measures, and the internal combustion engine 2 could stall.

With the function "internal combustion engine start-up," an internal combustion engine start-up via a friction locking clutch, without support via the electric machine 3, is possible. With a power-oriented drive, the start-up torque of the internal combustion engine (VM) 2 and the electric machine 3 can then be added together, or cumulative. For this, a friction locking clutch in the power flow from the internal combustion engine 2 to one of the two subtransmissions 5 or 6 is provided. This function is also useful as an emergency mode, for example, when a power electronic of the electric machine fails.

The function "internal combustion engine emergency mode without rotating electric machine" enables a start-up using only the internal combustion engine. This function is of particular advantage if the electric machine 3 has permanent magnets in its rotor, because otherwise a voltage would be induced when the rotor is rotating.

The function "electric driving via clutch slippage" is advantageous for preventing so-called derating when the electric machine 3 is at a standstill, or with very low rotational speeds of the electric machine 3. Then, if the rotational speed of the rotor in the electric machine 3 is too low, for purposes of power, particularly with synchronization machines in the power inverter, the load always has the same phase, such that the torque, due to overheating, needs to be deregulated after a certain time period. This effect of the derating can be prevented.

Regarding the function "internal combustion engine power shifting," conventional power shiftings can be depicted in the hybrid drive via the friction clutches.

In the function "gear stage selection independently of internal combustion engine and electric machine," different transmission ratios, in part, can be selected in the hybrid drive for the internal combustion engine (VM) 2 and the electric machine (EM) 3, specifically such that both the internal combustion engine 2 and the electric machine 3 can be operated at their desired duty point.

As can be seen from the above table, all of the functions described above can be used for the forms in FIGS. 4 and 5. Thus, the forms of FIGS. 4 and 5 are particularly advantageous.

REFERENCE NUMBERS 1 hybrid drive
2 internal combustion engine
3 electric machine
4 transmission
5 first subtransmission
6 second subtransmission
7 first input shaft
8 second input shaft
9 output shaft
10 shifting packet
11 first friction locking clutch
12 second friction locking clutch
13 output drive side clutch half
14 output drive side clutch half
15 third clutch
16 input drive side clutch half
17 input drive side clutch half
18 fourth clutch

What is claimed is:

1. A device comprising a transmission and an electric machine for a hybrid drive of a motor vehicle, the transmission comprising:
a first subtransmission and a second subtransmission, each of which has an input shaft and shares an output shaft,
wherein the input shafts of the first and second subtransmissions are selectively coupled to the output shaft by form locking shift elements of the first and second subtransmissions, a first input shaft of the first subtransmission being allocated to a first friction locking clutch, such that the first friction locking clutch is engaged between the first subtransmission and an internal combustion engine,
a second input shaft of the second subtransmission being allocated to a second friction locking clutch, such that the second friction locking clutch is engaged between the second subtransmission and the electric machine, a third clutch being incorporated between an input drive side clutch half of the first friction locking clutch and an input drive side clutch half of the second friction locking clutch, wherein the first friction locking clutch is coaxial with the second friction locking clutch, and wherein the input drive side clutch half of the first friction locking clutch is indirectly connected, via an intermediate connection through a fourth clutch, to the internal combustion engine, and the input drive side clutch half of the second friction locking clutch is directly connected to the electric machine.

2. The device according to claim 1, wherein an output drive side clutch half of the first friction locking clutch is fixedly connected to the first input shaft of the first subtransmission, and an output drive side clutch half of the second friction locking clutch is fixedly connected to the second input shaft of the second subtransmission.

3. The device according to claim 1, wherein when the first friction locking clutch and the third clutch are disengaged and the second friction locking clutch is engaged, the electric machine is coupled to the second subtransmission.

4. The device according to claim 1, wherein when the first friction locking clutch and the third clutch are engaged and the second friction locking clutch is disengaged, the electric machine is coupled to the first subtransmission.

5. The device according to claim 1, wherein the third clutch is a friction locking clutch.

6. The device according to claim 1, wherein the third clutch is a form locking clutch.

7. The device according to claim 1, wherein the input drive side clutch half of the first friction locking clutch is directly connected to the internal combustion engine, and the input drive side clutch half of the second friction locking clutch is directly connected to the electric machine.

8. The device according to claim 7, wherein when the first friction locking clutch is engaged, the internal combustion engine is coupled to the first subtransmission.

9. The device according to claim 1, wherein when the first friction locking clutch and the fourth clutch are both engaged, the internal combustion engine is coupled to the first subtransmission.

10. The device according to claim 1, wherein the fourth clutch is a friction locking clutch.

11. The device according to claim 1, wherein the fourth clutch is a form locking clutch.

12. A hybrid drive for a motor vehicle, comprising an internal combustion engine and a device according to claim 1.

\* \* \* \* \*